United States Patent [19]

Kellberg et al.

[11] 3,868,264
[45] Feb. 25, 1975

[54] METHOD OF APPLYING LIGHT DIFFUSING COATING TO INTERIOR OF INCANDESCENT LAMP ENVELOPE

[75] Inventors: Howard E. Kellberg, Corning; Dale F. Maynard, Painted Post, both of N.Y.

[73] Assignee: Corning Glass Works, Corning, N.Y.

[22] Filed: Mar. 21, 1973

[21] Appl. No.: 343,468

[52] U.S. Cl. .................. 117/10, 117/37 R, 117/97, 117/119 Z, 117/124 A, 117/159, 118/69, 118/317, 118/318, 118/643
[51] Int. Cl. ......................... B44d 1/46, B05c 11/00
[58] Field of Search..... 117/97, 119.2, 124 A, 37 R, 117/10, 159; 118/59, 69, 641, 642, 643, 317, 318

[56] References Cited
UNITED STATES PATENTS

| | | | |
|---|---|---|---|
| 1,817,783 | 4/1931 | Tsuyuki | 118/69 |
| 1,832,607 | 11/1931 | Zworykin | 117/97 |
| 1,871,367 | 8/1932 | Hageman | 117/97 |
| 1,999,014 | 4/1935 | Biggs et al. | 117/97 |
| 2,626,874 | 1/1953 | Pipkin | 118/318 |
| 2,692,209 | 10/1954 | Binder | 117/10 |
| 2,879,740 | 3/1959 | Mahon | 117/97 |
| 2,960,414 | 11/1960 | Gustin et al. | 117/124 A |
| 2,967,113 | 1/1961 | Liebhafsky | 117/97 |
| 2,970,928 | 2/1961 | Nickevson | 117/124 A |
| 3,015,586 | 1/1962 | Toohig | 117/119.2 |
| 3,279,937 | 10/1966 | Lopenski | 117/97 |
| 3,313,646 | 9/1967 | Van Zalinge | 118/69 |
| 3,734,056 | 5/1973 | King | 118/69 |
| 3,793,058 | 2/1974 | Rostoker | 117/97 |

*Primary Examiner*—William D. Martin
*Assistant Examiner*—William H. Schmidt
*Attorney, Agent, or Firm*—Thomas J. McNaughton; Clarence R. Patty, Jr.

[57] ABSTRACT

The interior surface of a glass incandescent lamp envelope is provided with a light-diffusing coating, on all but the neck portion thereof, by condensing the water, vaporized during the drying of an aqueous coating, on an annular surface band on the upper end of the envelope neck portion, while maintaining the envelope in a vertical neck-down position, with the condensing occurring at a rate sufficient to cause the condensate to run and thereby remove substantially all of the wet coating from the neck portion. The aqueous coating may be a water slurry of clay. Apparatus for carrying out the process is also disclosed.

4 Claims, 6 Drawing Figures

PATENTED FEB 25 1975 3,868,264
SHEET 2 OF 2
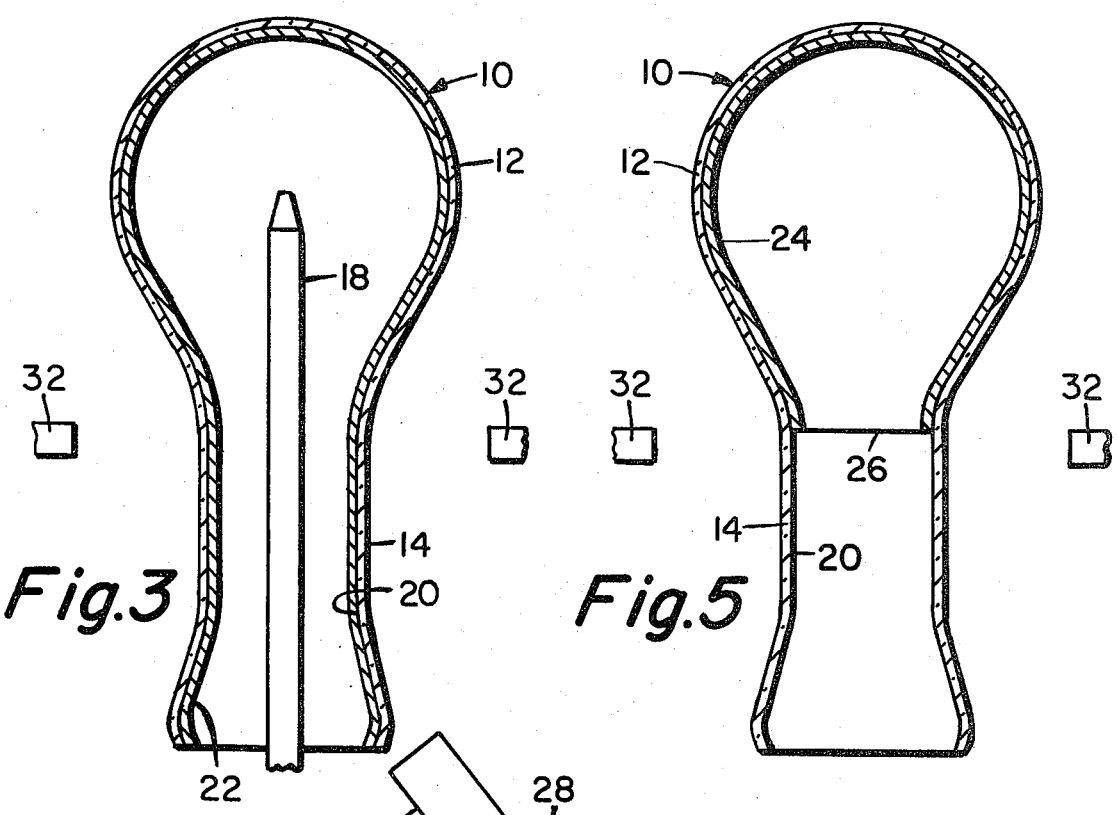
Fig.3
Fig.5
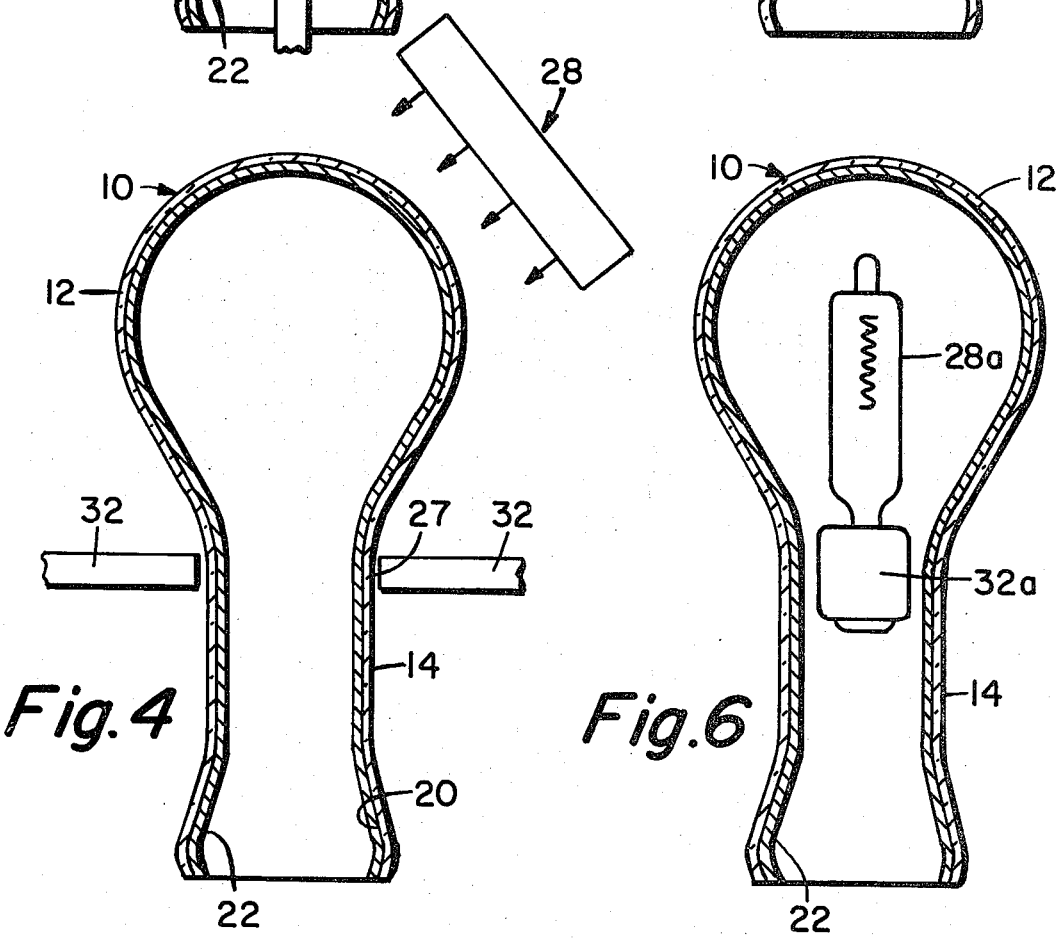
Fig.4
Fig.6

METHOD OF APPLYING LIGHT DIFFUSING COATING TO INTERIOR OF INCANDESCENT LAMP ENVELOPE

BACKGROUND OF THE INVENTION

The field to which this invention pertains is generally that of light-diffusing coatings, with particular emphasis on a coating apparatus and process for providing the interior surface of a glass incandescent lamp envelope with these coatings on all but the neck portion thereof.

At present, the most widely used method for preparing a frosted or light-diffusing bulb is by etching the inside of the bulb with hydrogen fluoride. There are several disadvantages inherent in this method. Hydrogen fluoride is a toxic, corrosive and highly dangerous chemical presenting many safety problems in its use. During the etching process, dangerous volatile fluorides are evolved, and toxic waste streams from the process must be discarded, presenting a serious pollution problem.

In the preparation of light bulbs, hydrogen fluoride frosting of the glass envelope operates to diffuse and disperse the light from the filament so that a softer, more pleasant light is radiated from the bulb. Without frosting, the filament and the glare therefrom are readily apparent and give a displeasing effect. Because of the difficulties associated with handling hydrogen fluoride, methods have long been sought to provide light-diffusing qualities to light bulbs without the necessity of etching, as, for example, by coating the bulbs with a light-diffusing coating. Coating an electric lamp bulb with a light-diffusing coating, while avoiding many of the problems associated with fluoride etching, involves numerous difficulties. Thus, the coatings must be able to withstand handling and ordinary exposure to dirt, moistue and abrasion. Further, in the case of interior coatings, reaction with the filament at use temperatures must be avoided, since any interaction or coating instability would adversely affect the useable life of the lamp.

It is known that certain smectite clays are excellent vehicles for the purpose of providing light-diffusing coatings on glass. In particular, it has been found that certain montmorillonite clays, which are representative of the dioctahedral smectites, can be suitable employed in glass coating systems to yield tightly bonded, abrasion-resistant coatings which, after suitable firing, do not readily absorb moisture from the atmosphere during storage, provided the alkali metal content and purity of the clay are sufficiently high. When employed in aqueous coating systems, these clays are readily dispersed into stable suspensions which may be simply applied to form smooth, uniform coatings on glass. The final coatings may consist of the clay alone, or may include light-diffusing agents such as silica, titania, wollastonite, or the like, and/or coloring agents of numerous types. The clay acts as an excellent vehicle for the dispersion and bonding of most inorganic light-diffusing and/or coloring constituents.

The light-diffusing coatings may be simply applied by preparing an aqueous slurry consisting essentially of the clay vehicle and water, and, optionally, light-diffusing and/or coloring agents; applying the suspension to the glass to form a uniform coating thereon; drying the coating to remove the water of suspension and, thus, to immobilize the coating on the glass, and finally, firing the dried coating to remove the structural water from the clay. The final coating thus consists of a dewatered or calcined clay film bonded to the glass and containing the various light-diffusing and coloring agents added to the aqueous slurry. The plating and adhesive qualities of the clay vehicle insure that a very uniform, highly stable and adherent coating will be formed.

Examples of suitable montmorilonite clay materials which are preferred as fulfilling all of the requirements hereinabove set forth for light-dispersing coatings include modified alkaline earth montmorillonite clays prepared as described, for example, in U.S. Pat. No. 3,408,305. For a further discussion of these clays and their properties, see *Clay Mineralogy* by R. E. Grim (2nd Ed., New York, McGraw-Hill, 1968).

It should be noted that the composition, preparation and application of the coatings about to be described is for informational purposes only and forms no part of this invention. Further details in regard to composition, preparation and application procedures, are described in copending U.S. application Ser. No. 190,657, filed Oct. 19, 1971 now U.S. Pat. No. 3,793,058 which is also assigned to the assignee of this invention.

The application of the light-diffusing coatings to a glass article to be coated involves the broad steps of applying an aqueous coating slurry of appropriate composition to the glass article to be coated, drying to remove excess water and firing to remove the structural water from the clay.

The coating slurry may be prepared by forming an aqueous suspension of a suitable clay in water and then adding to the suspension any desired light-diffusing or coloring agents. As much clay as possible will normally be incorporated into the suspension as will form a stable, flowable slurry; however, amounts in excess of about 5–7 percent by weight have been found to cause gelling and setting of the mixture on standing, and are preferably avoided. Smaller amounts of clay may be used, but if amounts less than about 3 percent by weight are employed, several slurry applications may be required. The suspension may be easily prepared by gradually adding powdered clay to warm water, while agitating, until a homogenous mixture is obtained.

Following the preparation of the clay slurry, light-diffusing agents such as silica, wollastonite, and/or titania (rutile) may be added if desired. Colorants such as the transition metal oxides may also be added, the amount depending upon the amount of coloration desired. Equivalent colorants include colored glass frits and the like.

The aqueous suspension of clay and, optionally, light-diffusing and coloring agents, may be applied to the glass to be coated by any suitable means, including dipping, spraying, brushing, or the like. It has been found that even coatings may be obtained on the inside of a bulb envelope by simply pouring the suspension into the bulb, pouring out the excess, and holding the bulb on a vibrating plate for several seconds to assure uniform coverage.

Following the application of an even coating by any suitable means, it has been found that quickly drying the coating to remove the water of suspension immobilizes the coating and helps to prevent the occurrence of thickness discontinuities therein.

Following drying, the coating should be fired to an elevated temperature in order to cause the clay to give up its structural water and bond to the glass surface. The firing temperature should be at least sufficient to extract the structural water from the clay, and preferably, the highest firing temperature possible short of the softening temperature of the bulb glass.

The discussion to date had been solely concerned with the glass envelope for a glass incandescent light bulb, with the envelope consisting basically of a bulbar, globular or rounded top portion that tapers or blends on its lower end into a generally cylindrical neck or moil portion. It is through this neck or moil portion that the filament is introduced into the bulbar portion and it is in the neck area that the sealing with the metallic base member is accomplished.

It has been found that very good light-diffusing coatings can be produced with the previously-described coating compositions. However, it was also found that no acceptable base-bulb seal can be made through these coatings and that the seal area must be substantially free of these coatings in order to make a good seal.

Several methods for removing the coating from the neck area have been devised. One method involves a "wet" wipe, after the coating is initially applied and while it is still wet, which makes use of small spray nozzle which is introduced into the neck area. This however, due to the scattering of the water spray, causes an inordinate number of rejects and makes it difficult to hold an accurate peripheral wipe-out line. Another method involves a "dry" wipe, after the coating is dried (but before firing), which is accomplished by brushing or wiping out the dried coating. While this gives a sharp, well defined cutoff, the buildup of the removed material on the brush or scraper quickly becomes a problem. Both of these methods make it difficult to produce large volumes of bulbs at low cost.

SUMMARY OF THE INVENTION

This invention solves the previously-mentioned problems of removing the light-diffusing coating in the neck portion of the glass lamp envelopes by using a novel new process and apparatus therefor. The apparatus, which includes means for applying a wet, aqueous, coating on the entire interior surface of the glass envelope, further includes means for drying the coating so as to remove, by vaporization, substantially all of the water in the wet coating. While this drying takes place, not only is the glass envelope maintained in an upright, vertical, neck-down position, but a means for condensing causes condensation of vaporized water on an annular surface band on the upper end of the inner surface of the envelope neck portion. The amount of vaporized water that is condensed on this annular surface band is sufficient to cause the condensate to run down the envelope neck portion so as to substantially remove the wet coating therefrom. If desired, the lamp envelope is rotated during the drying of the wet coating. In addition, the drying means and the condensing means may be located either on the inside or the outside of the envelope neck portion. Furthermore, the condensing means may be a heat sink, a heat energy reflector and/or a combination of same.

This invention also includes an improvement in a process for providing the interior surface of a glass envelope with a light-diffusing coating on all but the neck portion thereof. The process includes the known steps of applying a slurry to form a wet coating on the entire inner surface of the envelope and drying the wet coating to remove, by vaporization, substantially all of the water in the wet coating. The improvement includes the addition, during the drying step of the following substeps: maintaining the envelope in a vertical, neck-down position; condensing the water removed by vaporization on an annular surface band on the upper end of the inner surface of the envelope neck portion; and forming the condensate at a rate sufficient to cause the condensate to run down the envelope neck portion and thereby substantially remove the wet coating therefrom. The condensing is accomplished by keeping the temperature of the annular band below 100°C during the drying step.

BRIEF DESCRIPTION OF THE DRAWINGS

FIG. 3 is a schematic view of the slurry applying means used for coating the inner surface of a vessel.

FIG. 4 is a schematic view showing one of the embodiments of the drying means and condensing means used in this invention.

FIG. 5 is a schematic view showing the inner surface of the vessel to be coated on all but the neck portion thereof.

FIG. 6 is a schematic view showing another embodiment of the drying and condensing means of this invention.

DESCRIPTION OF THE PREFERRED EMBODIMENTS

Figure 1:
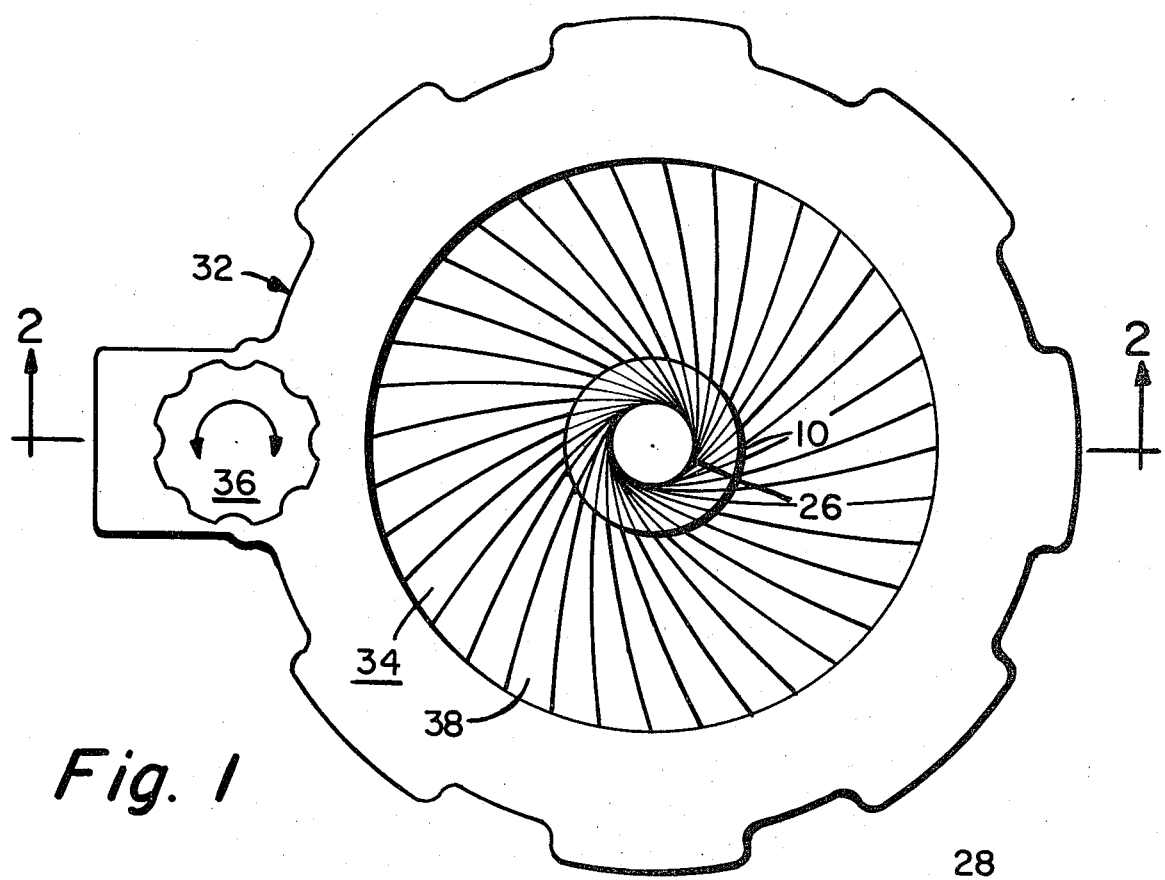
FIG. 1 is a top view of a part of the apparatus of this invention that is used for practicing the process of this invention.

Prior to discussing the apparatus and process of this invention in detail a quick review of the overall coating process may be helpful. The basic process for applying a light-diffusing coating to the interior surface of a glass incandescent bulb includes the steps of:

a. applying a stable, flowable, aqueous slurry, consisting essentially of water, clay and optionally containing light-diffusing and/or coloring agents to the entire interior surface of the glass envelope to form a wet coating thereon; and b. drying the wet coating to remove, by vaporization, substantially all of the water in the wet coating.

As best seen in FIG. 3, glass lamp envelope 10, which generally has a wall thickness of about 0.020 inches, also has a bulbous top portion 12 that gradually tapers into a generally cylindrical lower moil or neck portion 14. It is in the area of the neck portion that the sealing with a metallic base member (not shown) is accomplished. FIG. 3 also shows means 18, in the form of an orificed tubular member, for applying an aqueous slurry (as previously defined) to the entire interior surface 20 of envelope 10 so as to form a wet coating 22 thereon. As noted, since sealing cannot be accomplished through the light-diffusing coating, it must be removed either while it is still wet or after drying so that bulb interior surface 20, in neck portion 14 (as best seen in FIG. 5), is free of the coating. FIG. 5 also shows dried coating 24 on the interior surface of bulbar portion 12, with the demarcation between coating 24 and neck portion 14 being defined as wipe-out line 26.

Figure 2:
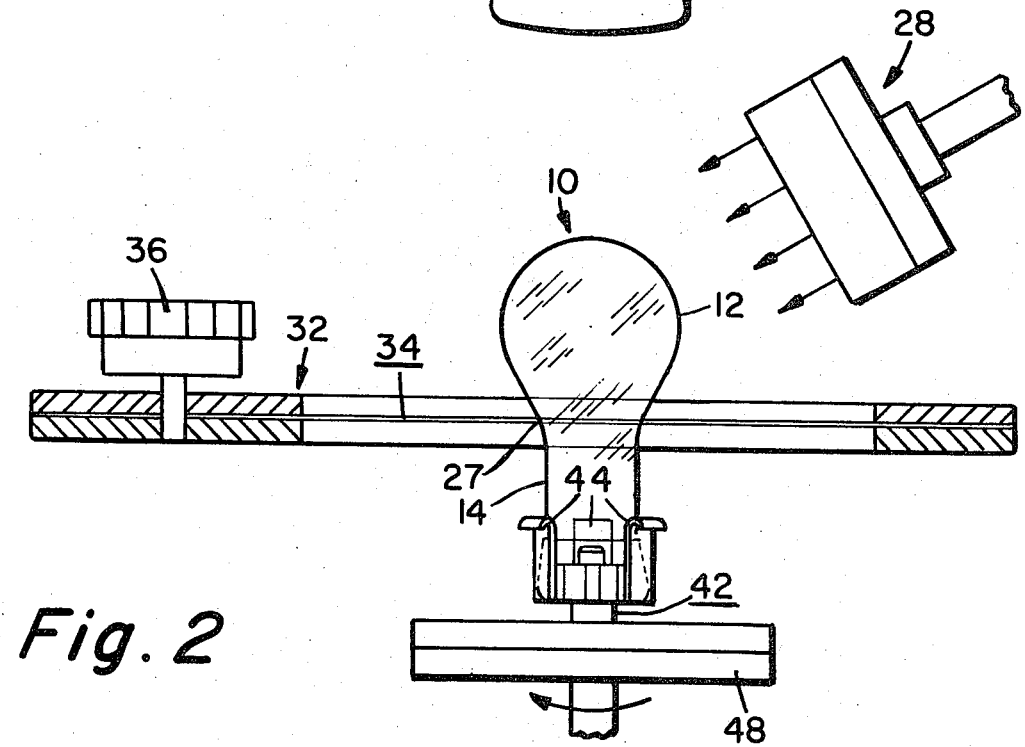
FIG. 2 which is a partial sectional view taken long line 2—2 of FIG. 1, also shows one of the drying means of this invention.

After the entire envelope inner surface 20 has been coated with wet coating 22, envelope 10 is transferred to the apparatus shown in FIGS. 1 and 2. FIGS. 1 and 2 show condensing means 32 while FIG. 2 also shows drying means 28. While drying means 28 is shown in the form of a source of radiant heat energy, such a conventional gas-air burner (for example, Selas Radiant Burner, Style K-521-M2, with No. 51 tip for natural gas, both of which are manufactured by Selas Corporation of America located in Dresher, Penna.), it could also readily be any other source of heat energy, radiant or otherwise. Furthermore, while drying means 28 is shown at an angle with reference to envelope 10, this is not necessary, as long as fairly uniform heat distribution is achieved. If desired, drying means 28 may also be rotated to improve heat distribution.

Condensing means 32, which preferably is a heat sink, heat shield, reflector or deflector (and which may be gas or liquid cooled), is shown in FIGS. 1 and 2 in the illustrative form of an iris 34 that may be manually opened and closed by turning knob 36 in the approprate direction. Thus, by, for example, turning knob 36 counter clockwise, the individual members 38 of iris 34 can be retracted so as to form a center circular opening large enough to permit insertion therein (or removal therefrom) of envelope 10 with reference to holding means 42. Holding means 42, which holds envelope 10 in an upright vertical neck-down position, may, for example, be a three-spoked spider, wherein the spokes radiate from a central hub and are equipped with upwardly extending spring-steel fingers 44 which releasably hold the lower part of envelope neck portion 14 therebetween. If desired, holding means 42 is concentrically mounted on a turntable 48.

After wet-coated envelope 10 is inserted onto holding means 42, the diameter of the circular opening in iris 34 is reduced (by turning knob 36) until iris members 38 are in close proximity to an annular surface band 27 on the upper end of envelope neck portion 14, with the upper end of band 27 basically coinciding with the desired clean-out line 26 (in this case on the boundary between the coated bulbar envelope top portion and the coating-free envelope neck portion 14). The transverse extent of annular band 27 of course depends on the type of condensing means utilized.

Once condensing means 32 is positioned in the close proximity of envelope annular band 27, drying means 28 is actuated as to dry wet coating 22. Drying of coating 22 is accomplished by vaporizing substantially all of the water in wet coating 22. Condensing means 32 in turn condenses, during the drying of coating 22, an amount of vaporized water, in the area of annular band 27 and therebelow, at a rate sufficient to cause this condensate to form droplets. These droplets, which run down envelope neck portion 14, substantially remove all of wet coating 22 therefrom. Thus, envelope neck portion 14, starting at clean-out line 26, thereafter becomes substantially free of coating 22, and as soon as the coating dries, iris 34 is opened and the envelope is removed from holding means 42.

It should be apparent that coating applying means 18 (shown in FIG. 3) could readily be incorporated into the apparatus shown in FIG. 1 and 2.

While the description to date has been with reference to an external (to envelope 10) drying means 28 and an external condensing means 32 this invention is in no way limited thereto. FIG. 6 illustrates an internal (to envelope 10) drying means 28a and an internal condensing means 32a. Internal drying means 28a may, for example, take the form of a quartz iodide lamp that can be inserted into the interior of envelope 10 through envelope neck portion 14. The base of the quartz iodide lamp acts as a condensing means 32a to condense (after 28a is energized) the vaporized water from coating 22 to condense in envelope neck area 14 at a rate sufficient to cause droplets to form, which droplets, by running down the neck portion, remove the unwanted coating 22 therefrom. Various combinations of inside as well as outside drying and condensing means may thus be utilized.

Thus, basically, the wet coating removal is achieved by the water of vaporization, formed while drying the water-clay coating, and its uniform condensation on envelope inner surface 20 at an area opposite the location of the condensing means which is generally in the form of a heat sink-reflector. Adequate condensate collects, if drying takes place quickly enough, to run down neck portion 14 so as to carry with it wet coating 22.

Sufficient heat energy should be utilized so that drying of the envelope's top center portion and upper half starts almost simultaneously and is complete within 5 to 15 seconds. Drying preferably continues in the lower half of the bulb in the area above neck portion 14, i.e. above wipe-out line 26, with the total drying cycle taking place in approximately 30 to 45 seconds. Other drying cycles are of course feasible but it should be remembered that insufficient heat or an excessively long drying cycle will not produce sufficient water vapor rapidly enough to effect a good wipe out. Excessive heat is apt to crack coating 22 and/or the bulb body.

As noted, the wipe-out achieved by this invention, below wipe-out line 26, is such that bulb neck portion 14 is sufficiently free of coating 22 so that no contamination takes place during the subsequent sealing operations performed by the lamp makers. It should also be noted that by slightly varying the distance between the condensing means and the bulb neck portion either a sharp or diffused cut-off or wipe-out line can be obtained.

One of the main advantages of this invention is that the wipe-out or coating removal is basically achieved automatically as a by-product of the drying operation, simply by supplying a condensing means at the proper position (i.e., wherever the cut-off is desired) with reference to the bulb neck portion.

Different forms of heat sources will work, but this is relatively unimportant to the invention as long as the temperature in the wipe-out area (neck portion 14) is 100°C or below, so that the vaporized water, from envelope bulbar portion 12, will condense thereon. In addition, relative rotation between the drying means and envelope 10, while of benefit in terms of uniform heat distribution, is not necessary in order to obtain the required condensation.

Of course, in order to obtain the required condensation, the aqueous slurry must be high in water content. With the particular clay-water mixture (as well as optional light-diffusing and/or coloring agents) used in this invention, the water content may be from about 80 to 95 per cent by weight. While lower water content coatings may also provide a good wipe-out it is uncertain if the coatings themselves would be satisfactory.

FIGS. 3 to 5 are schematic views of the process of this invention. In FIG. 3, wet coating 22 is uniformly applied to the entire interior surface 20 of envelope by coating applying means 18. Condensing means 32 are shown remote from envelope neck portion 14.

In FIG. 4 (after wet coating 22 has been applied and the envelope is in a vertical neck-down position) drying means 28 is activated substantially simultaneously with bringing condensing means 32 in close proximity with annular band area 27 on the upper end of envelope neck portion 14 (with the width of band 27 being the width dimension of the condensing means). Thereupon (not shown) the water vapor being vaporized by drying means 28 is condensed by condensing means 32 on at least annular surface band 27 at a rate sufficient to cause the condensate to run down neck portion 14.

FIG. 5 shows bulb envelope 10 after the wet coating has been removed in neck portion 14 (from wipe-out line 26 downward) and only dried coating 24 remains in the bulb area above wipe-out line 26. Condensing means 32 is again shown remote from neck portion 14 and the bulb is now ready for the firing step (which forms no part of this invention).

The coating apparatus and process of this invention have been discussed with specific reference to removing a clay-water mixture (which is used as a light-diffusing coating) from the interior neck surface of a glass incandescent lamp envelope. However, other aqueous coatings should also be removable from the interior surface of any thin-walled glass vessel having an open end and a closed end, with the removal occurring in an annular area extending from the open end thereof.

While the invention has been described in connection with possible forms or embodiments thereof, it is to be understood that the present disclosure is illustrative rather than restrictive and that further changes or modifications may be resorted to without departing from the spirit of invention or scope of the claims which follow.

What is claimed is:

1. A process for providing selected portions only of the interior surface of a glass lamp envelope with a light-diffusing coating comprising the steps of:
   a. applying an aqueous slurry coating consisting essentially of clay and a high majority by weight of water, to the entire interior surface of a glass incandescent envelope having an upper, closed bulbous portion and a lower open end neck portion adjacent said closed bulbous portion;
   b. maintaining said envelope in an upright, vertical open-end-down position;
   c. placing a condensing means below said bulbous portion and in close proximity to an area corresponding to an annular surface band on the inner surface of the upper end of said neck portion;
   d. applying heat solely to said closed bulbous portion to vaporize water from said slurry coating on the interior surface of said closed bulbous portion to dry said slurry coating on said closed portion; and
   e. condensing on said annular surface band of said neck portion the water vaporized from said slurry coating on said closed bulbous portion at a rate sufficient to cause the vaporized water to run down said open end neck portion and substantially remove the slurry coating from said open end neck portion inner surface blow said condensing means.

2. The process of claim 1 wherein said slurry coating further includes a light-diffusing agent.

3. The process of claim 1 wherein said slurry coating further includes a coloring agent.

4. The process off claim 1 wherein said slurry coating further includes light-diffusing and coloring agents.

* * * * *